(12) United States Patent
Ben-Ari et al.

(10) Patent No.: US 8,537,945 B1
(45) Date of Patent: Sep. 17, 2013

(54) SYNCHRONIZATION OF TIME ACCURATE STROBE (TAS) MESSAGES

(75) Inventors: Daniel Ben-Ari, Moshav Zur Natan (IL); Avner Epstein, Givatayim (IL)

(73) Assignee: Marvell International Ltd., Hamilton (BM)

( * ) Notice: Subject to any disclaimer, the term of this patent is extended or adjusted under 35 U.S.C. 154(b) by 405 days.

(21) Appl. No.: 12/951,047

(22) Filed: Nov. 21, 2010

Related U.S. Application Data

(60) Provisional application No. 61/263,664, filed on Nov. 23, 2009.

(51) Int. Cl.
*H04L 7/00* (2006.01)

(52) U.S. Cl.
USPC ........... 375/354; 375/316; 375/326; 375/327; 375/362; 375/373

(58) Field of Classification Search
USPC .................. 375/215, 294, 295, 302, 316, 326, 375/327, 354, 362, 373
See application file for complete search history.

(56) References Cited

U.S. PATENT DOCUMENTS

| | | | |
|---|---|---|---|
| 6,437,601 B1 * | 8/2002 | Borkar et al. .................... | 326/93 |
| 6,469,514 B2 * | 10/2002 | Okayasu ........................ | 324/532 |
| 7,571,338 B2 * | 8/2009 | Osterling et al. .............. | 713/500 |
| 7,750,845 B2 * | 7/2010 | Lethbridge ............... | 342/357.22 |
| 7,936,793 B2 * | 5/2011 | Quiroga et al. ................ | 370/506 |
| 7,948,964 B1 * | 5/2011 | Khlat et al. .................... | 370/350 |
| 8,170,166 B2 * | 5/2012 | Stebbings et al. ............. | 375/354 |
| 2009/0154446 A1 | 6/2009 | Adler et al. | |
| 2010/0074311 A1 * | 3/2010 | Kopmeiners ................... | 375/220 |
| 2010/0215133 A1 * | 8/2010 | Stebbings et al. ............. | 375/354 |
| 2011/0176535 A1 * | 7/2011 | Lipka et al. .................... | 370/350 |
| 2011/0206143 A1 * | 8/2011 | Reinhardt et al. ............. | 375/259 |

OTHER PUBLICATIONS

Draft Version 3.09.05 Revision 0.02—Dec. 7, 2009; Draft MIPI Alliance Specification for Dual Mode 2.5G/3G Baseband RFIC Interface; 2009; pp. 1-51; MIPI Alliance, Inc.
Draft Version 1.00.00 Revision 0.03—Dec. 15, 2009; Draft MIPI Alliance Specification for DigRFSM v4; 2009; pp. 1-192; MIPI Alliance, Inc.
U.S. Appl. No. 12/948,784 Office Action dated Jan. 3, 2013.

\* cited by examiner

*Primary Examiner* — Hirdepal Singh

(57) ABSTRACT

An apparatus includes Radio Frequency (RF) circuitry and baseband circuitry. The RF circuitry is configured to receive strobe messages that are based on a system clock over a digital interface, and to communicate synchronously with the system clock based on the received strobe messages in accordance with a Radio Access Technology (RAT) that is selected from among multiple different RATs. The baseband circuitry is configured to generate the strobe messages, to delay the strobe messages by a delay that depends on the selected RAT, and to send the delayed strobe messages to the RF circuitry over the digital interface.

18 Claims, 2 Drawing Sheets

US 8,537,945 B1

SYNCHRONIZATION OF TIME ACCURATE STROBE (TAS) MESSAGES

CROSS-REFERENCE TO RELATED APPLICATIONS

This application claims the benefit of U.S. Provisional Patent Application 61/263,664, filed Nov. 23, 2009, whose disclosure is incorporated herein by reference in its entirety.

FIELD OF THE DISCLOSURE

The present disclosure relates generally to communication systems, and particularly to processing timing strobe messages in communication equipment.

BACKGROUND

Some communication systems carry out time synchronization functions using timing strobe messages. For example, the DigRF specifications developed by the Mobile Industry Processor Interface (MIPI) Alliance define Time Accurate Strobe (TAS) messages for synchronizing Baseband Integrated Circuits (BBICs) and Radio Frequency Integrated Circuits (RFICs) over DigRF interfaces.

DigRF interfaces are specified, for example, in "MIPI Alliance Specification for DigRF v4," draft version 1.00.00, revision 0.03, Dec. 15, 2009, which is incorporated herein by reference in its entirety. Section 6.5.3 of this specification addresses TAS messages. DigRF interfaces are also specified in "MIPI Alliance Specification for Dual Mode 2.5G/3G Baseband/RFIC Interface," draft version 3.09.05, revision 0.02, Dec. 7, 2009, which is incorporated herein by reference in its entirety.

In the context of the present patent application and in the claims, the term "DigRF specification" refers collectively to any and all DigRF specifications and their variants and extensions, unless specifically noted otherwise.

The description above is presented as a general overview of related art in this field and should not be construed as an admission that any of the information it contains constitutes prior art against the present patent application.

SUMMARY

An embodiment that is described herein provides an apparatus including Radio Frequency (RF) circuitry and baseband circuitry. The RF circuitry is configured to receive strobe messages that are based on a system clock over a digital interface, and to communicate synchronously with the system clock based on the received strobe messages in accordance with a Radio Access Technology (RAT) that is selected from among multiple different RATs. The baseband circuitry is configured to generate the strobe messages, to delay the strobe messages by a delay that depends on the selected RAT, and to send the delayed strobe messages to the RF circuitry over the digital interface.

In some embodiments, the digital interface operates in accordance with a DigRF specification, the RF circuitry is configured to receive DigRF Time Accurate Strobe (TAS) messages, and the baseband circuitry is configured to generate the TAS messages. In an embodiment, the baseband circuitry includes a programmable counter, and is configured to delay the strobe messages by initializing the programmable counter based on the delay and enabling the strobe messages upon expiry of the counter. In an alternative embodiment, the baseband circuitry includes a First In First Out (FIFO) memory having a configurable latency, and is configured to delay the strobe messages by setting the latency of the FIFO memory based on the delay and streaming the strobe messages through the FIFO memory.

In a disclosed embodiment, the RF circuitry is configured to communicate at a first time granularity, and the baseband circuitry is configured to generate the strobe messages at a second time granularity that is coarser than the first time granularity, and to set the delay to compensate for a mismatch between the first and second time granularities. In an embodiment, the digital interface operates at a third time granularity that is different from the first and second time granularities, and the baseband circuitry is configured to set the delay to compensate for the mismatch among the first, second and third time granularities. In an embodiment, the second time granularity of the baseband circuitry depends on the selected RAT.

In an embodiment, the digital interface has a variable initialization latency that does not exceed a specified maximum latency, and the baseband circuitry is configured to set the delay to be higher than the specified maximum latency. In another embodiment, the RF circuitry is of a given version that is selected from two or more possible versions, and the baseband circuitry is configured to set the delay depending on the given version of the RF circuitry. In some embodiments, a mobile communication terminal includes the disclosed apparatus. In some embodiments, a chipset for processing signals in a mobile communication terminal includes the disclosed apparatus.

There is additionally provided, in accordance with an embodiment that is described herein, a method including generating strobe messages using baseband circuitry based on a system clock. The strobe messages are delayed in the baseband circuitry by a delay that depends on a Radio Access Technology (RAT) that is selected from among multiple different RATs. The delayed strobe messages are sent over a digital interface from the baseband circuitry to Radio Frequency (RF) circuitry. At the RF circuitry, the strobe messages are received over the digital interface, and communication is carried out synchronously to the system clock based on the received strobe messages in accordance with the selected RAT.

The present disclosure will be more fully understood from the following detailed description of the embodiments thereof, taken together with the drawings in which:

DETAILED DESCRIPTION OF EMBODIMENTS

Embodiments that are described herein provide improved methods and systems for processing timing strobe messages in communication equipment. In some embodiments, a mobile communication terminal comprises baseband (BB) circuitry and Radio Frequency (RF) circuitry, which are interconnected by a digital interface such as a DigRF interface. The RF circuitry transmits and/or receives RF signals that are synchronized to a system clock, in accordance with a certain Radio Access Technology (RAT). The system clock is typically available in the BB circuitry, and the BB circuitry synchronizes the RF circuitry to the system clock by sending strobe messages from the BB circuitry to the RF circuitry over the digital interface.

In order to meet the specified timing requirements of the RAT, in an embodiment the RF circuitry is configured to receive the strobe messages with accurate timing and little or no jitter. In practice, however, various factors in the design of the BB circuitry, RF circuitry and the digital interface may introduce various errors into the arrival times of the strobe messages. For example, some communication terminals support multiple RATs, with each RAT specifying a different delay for the strobe messages. As another example, the RF circuitry may operate at a finer time granularity relative to the BB circuitry, e.g., using a faster clock rate. The coarser granularity of the BB circuitry may then cause timing errors in the transfer of strobe messages. As yet another example, different versions of the RF circuitry may be provided, e.g., versions produced by different vendors, with each version having a different latency requirement for strobe messages.

The methods and systems described herein compensate for timing errors that affect the transfer of strobe messages from the BB circuitry to the RF circuitry. In some embodiments, the BB circuitry compensates for such errors by delaying the strobe messages by a programmable delay, e.g., using a programmable counter or a First-In-First-Out (FIFO) memory.

In various embodiments, the programmable delay is set to a value that depends on the currently-used RAT, compensates for granularity differences between the BB and RF circuitry, and/or compensates for latency variations between RF circuitry versions. In some embodiments, the digital interface has a certain initialization time, and the selected programmable delay is set sufficiently high to compensate for the initialization time of the digital interface.

By using the disclosed techniques, the RF circuitry receives the strobe messages with accurate timing, and is therefore able to transmit and/or receive RF signals that meet the timing requirements specified for the applicable RAT.

Figure 1:
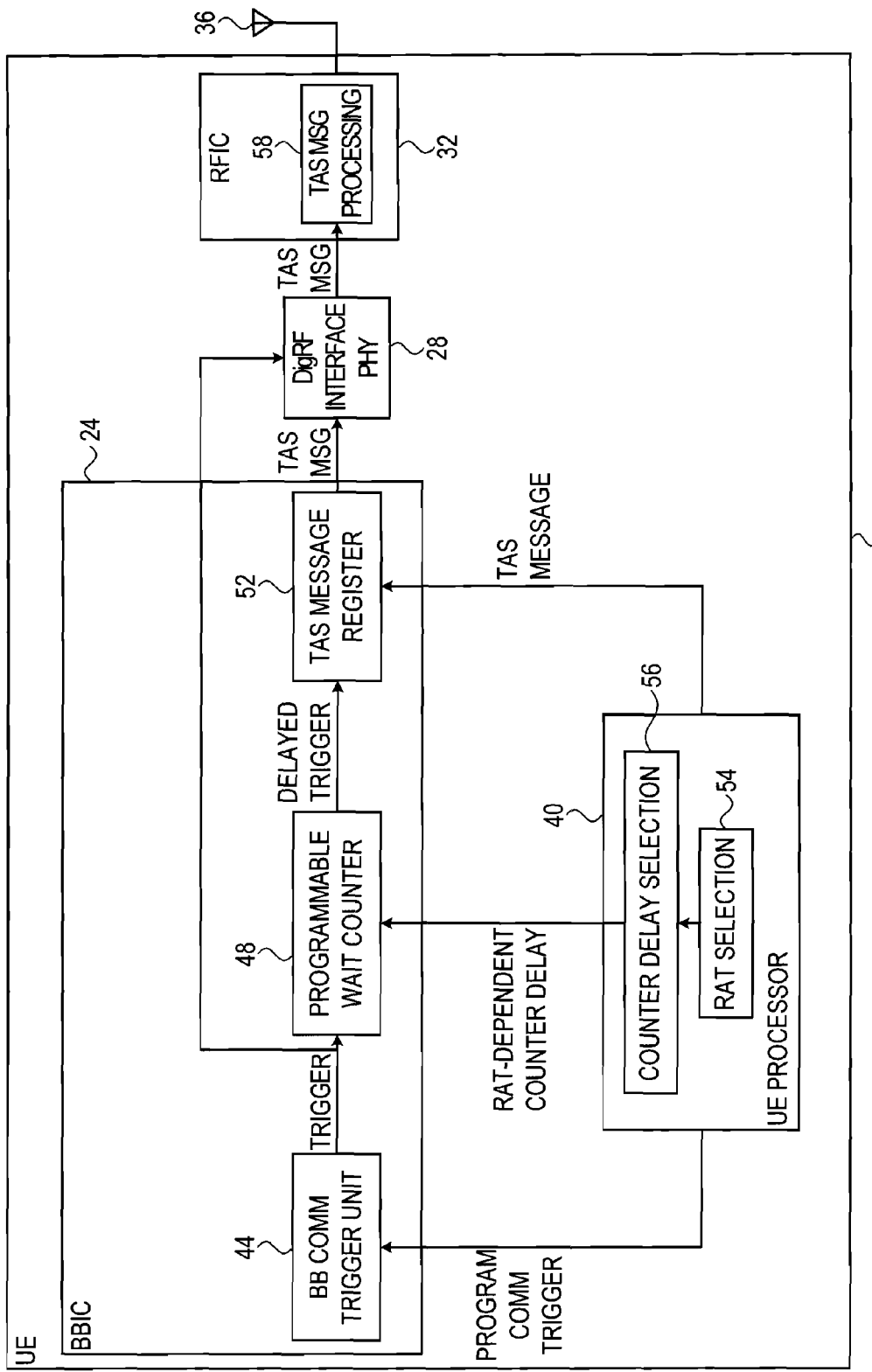
FIG. 1 is a block diagram that schematically illustrates a mobile communication terminal that uses TAS messages, in accordance with an embodiment that is described herein.

FIG. 1 is a block diagram that schematically illustrates a mobile communication terminal 20 that uses TAS messages, in accordance with an embodiment that is described herein. Terminal 20 may comprise, for example, a mobile phone, a wireless-enabled mobile computing device, or any other suitable type of communication terminal. Terminal 20 is also referred to as User Equipment (UE).

UE 20 operates in accordance with one or more Radio Access Technologies (RATs). In some embodiments, the UE supports a single RAT. In alternative embodiments, the UE supports multiple RATs. In embodiments, RATs supported by UE 20 comprise, for example, one or more of Evolved Universal Terrestrial Radio Access (E-UTRA), also referred to as Long-Term Evolution (LTE), LTE-Advanced (LTE-A), Global System for Mobile communications (GSM), Wideband Code-Division Multiple Access (WCDMA), and/or any other suitable RAT. Although the embodiments described herein refer mainly to communication terminals, the disclosed techniques can be used for synchronization in other types of communication equipment, such as base stations.

In the present example, UE 20 comprises a Baseband Integrated Circuit (BBIC) 24, which communicates with a Radio Frequency Integrated Circuit (RFIC) via a DigRF interface device 28. Device 28 is also referred to as a DigRF interface physical layer (PHY), or DigRF interface, for brevity. RFIC 32 communicates with a suitable base station (not shown) using RF signals via an antenna 36. On transmission, BBIC 24 produces messages for transmission and transfers them over DigRF interface 28 to RFIC 32. On reception, RFIC receives messages and transfers them for decoding to BBIC 24 via DigRF interface 28.

A UE processor 40 manages operation of the UE, and participates in the synchronization processes, as will be explained below. UE processor 40 may comprise any suitable type of programmable processor, such as a Digital Signal Processor (DSP) or microcontroller.

At a given time, transmission and reception in RFIC 32 are performed in accordance with a particular RAT. The RAT typically specifies a protocol in time and/or frequency that governs the transmission and reception of messages by RFIC 32. The RAT typically defines a system clock, and timing accuracy requirements with respect to the system clock that should be met by RFIC 32.

In some embodiments, the system clock is available in BBIC 24, and BBIC 24 causes RFIC 32 to operate (e.g., generate events) synchronously with the system clock by sending Time Accurate Strobe (TAS) messages to RFIC 32 over DigRF interface 28. The TAS messages are short messages that are specified, in accordance with the DigRF specifications, to have an accurate timing. Thus, when RFIC 32 generates events or otherwise operates in response to reception of the TAS messages from BBIC 24, the timing of the RFIC operation will follow the system clock. In an example embodiment, RFIC 32 comprises TAS message processing circuitry 58, which receives the TAS messages over DigRF interface 28 and initiates the appropriate events in RFIC 32 in response to the received TAS messages.

In practice, however, various factors in BBIC 24, DigRF interface 28 and/or RFIC 32 may degrade this timing accuracy. In some embodiments, UE 20 applies an accurate timing mechanism, which causes TAS messages to arrive in RFIC 32 at highly-accurate timing.

In the embodiment of FIG. 1, BBIC 24 comprises a baseband (BB) communication trigger unit 44, a programmable counter 48 and a TAS message register 52, all controlled by UE processor 40. Trigger unit 44 is programmed with a certain system time T, in accordance with the system clock, at which a TAS message is to be generated. The TAS message is loaded into TAS message register 52. Programmable counter 48 is programmed to a delay denoted WAIT. When the system time in BBIC 24 reaches T, trigger unit 44 issues a trigger to counter 48. Upon receiving the trigger, counter 48 counts the delay WAIT. Upon expiry of the WAIT delay, counter 48 issues a delayed trigger to TAS message register 52. The description that follows explains how the programmable counter mechanism of counter 48 compensates for various timing inaccuracies.

In some embodiments, UE 20 comprises a multi-RAT terminal that supports two or more RATs. In some cases, different RATs may specify different system clocks. Additionally or alternatively, RFIC 32 may require different TAS message latencies (i.e., different time offsets between the arrival time of a TAS message and the system time indicated by the message) for different RATs.

In an embodiment, UE processor 40 loads counter 48 with a delay WAIT that depends on the RAT that is currently used by the UE. In an example embodiment, UE processor 40 comprises a RAT selection module 54 that selects the appropriate RAT for operating the UE, and a counter delay selection module 56 that loads counter 48 with a delay WAIT depending on the RAT selected by RAT selection module 54. Thus, when UE 20 switches from one RAT to another, UE processor 40 modifies the WAIT delay that is programmed in counter 48, so as to match the currently-used RAT.

In some embodiments, RFIC 32 operates at a finer time granularity than BBIC 24. In an example embodiment, RFIC 32 operates at a higher clock rate than BBIC 24. In an example embodiment of a LTE UE, the baseband samples are based on a 30.72 MHz clock while the DigRf symbols are based on a 124.8 MHz clock. Alternatively, any other suitable clock rates can also be used. In such embodiments, the RFIC expects to receive the TAS messages at an accuracy that is on the order of the time granularity (clock rate) of the RFIC. Since the BBIC operates at a coarser time granularity, it is typically unable to guarantee this accuracy.

In an embodiment, programmable counter 48 operates at a high clock rate, e.g., at the clock rate of DigRF interface 28 or of RFIC 32. As such, UE processor 40 can program counter 48 at a fine time granularity, with a WAIT delay that compensates for the difference in time granularity between the BBIC and RFIC. In other words, by using the fine time granularity of counter 48, the TAS messages can arrive at RFIC 32 at highly-accurate timing, regardless of the coarse time granularity of BBIC 24.

When UE 20 comprises a multi-RAT UE, the time granularity of BBIC 24 may vary from one RAT to another. As explained above, in some embodiments counter 48 is programmed with WAIT delays that vary from one RAT to another. The different WAIT delays are configured to compensate for the difference in BBIC time granularity for different RATs, as well.

In some embodiments, DigRF interface 28 operates at a time granularity (e.g., clock rate) that is different from the time granularities of BBIC 24 and RFIC 32. In an example embodiment, the DigRF interface operates at a clock rate of 124.8 Msymbol/sec (1248 Mbit/sec), while the BBIC operates at a clock rate of 30.72 Msample/sec (i.e., ~615 Mbit/sec, since each sample in the present example is comprises 20 bits and therefore ~615 Mbit/sec) and the RFIC operates at a clock rate of 1248 Mbit/sec. In an embodiment, UE processor 40 programs counter 48 with a WAIT delay that compensates for the difference in time granularity between DigRF interface 28 and BBIC 24 or RFIC 32.

As yet another example, in some cases RFIC 32 is provided in different versions, e.g., versions produced by different vendors. Different versions of RFIC 32 may require different TAS message latencies (i.e., different time offsets between the arrival time of a TAS message and the system time indicated by the message). In some embodiments, UE processor 40 programs counter 48 with a WAIT delay that matches the latency required by the specific RFIC version. Thus, different RFIC versions can be used in UE 20 without additional hardware modifications.

In some embodiments, DigRF interface 28 has a certain initialization time from receiving a wake-up trigger until it is ready to transmit messages. The DigRF interface initialization delay may not be constant (e.g., it may vary from several tens to several hundreds of clock cycles), but is typically bounded by some maximum delay. Once initialized, the pass-through latency of DigRF interface 28 is substantially constant. In some embodiments, BBIC 24 initializes DigRF interface 28 using the non-delayed trigger (the trigger that is produced by trigger unit 44, before it is delayed by counter 48). In addition, UE processor 40 sets the WAIT delay of counter 48 to be sufficiently high, so that DigRF interface 28 has sufficient time to initialize before a TAS message arrives from TAS message register 52. Typically, UE processor sets the WAIT delay to be higher than the upper bound of the DigRF initialization time.

In the embodiment of FIG. 1, UE 20 delays the transfer of TAS messages by delaying the trigger that triggers the TAS messages using programmable counter 48. In alternative embodiments, the UE 20 may delay the transfer of TAS messages using any other suitable mechanism. For example, in an alternative embodiment (not shown in the figures) BBIC 24 transfers ("streams") the TAS messages via a First-In-First-Out (FIFO) memory having a programmable latency. The latency of the FIFO memory is controlled by UE processor 40. By adjusting the FIFO latency, the UE processor can compensate for errors and inaccuracies in the TAS message transfer, such as the example inaccuracies described above.

The configuration of UE 20 in FIG. 1 is an example configuration, which is chosen solely for the sake of clarity. In alternative embodiments, any other suitable UE configuration can also be used. Some UE elements that are not mandatory for understanding of the disclosed techniques have been omitted from the figure for the sake of clarity.

The different elements of UE 20 are typically implemented using dedicated hardware, such as using one or more Application-Specific Integrated Circuits (ASICs) and/or Field-Programmable Gate Arrays (FPGAs) and/or other suitable hardware devices. Alternatively, some UE elements may be implemented using software running on programmable hardware, or using a combination of hardware and software elements. In some embodiments, some or all of the elements of UE 20 are fabricated in a chip-set. When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

In the present context, BBIC 24 and UE processor 40 can be viewed jointly as baseband circuitry that carries out the disclosed techniques. The functions of RFIC 32 can be implemented using any suitable type of RF circuitry.

Figure 2:
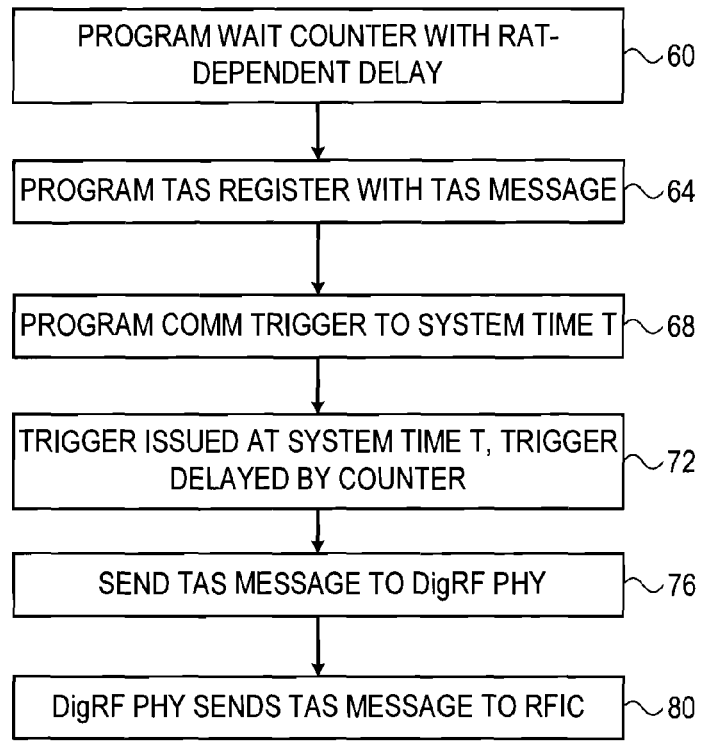
FIG. 2 is a flow chart that schematically illustrates a method for generating and transferring TAS messages, in accordance with an embodiment that is described herein.

FIG. 2 is a flow chart that schematically illustrates a method for generating and transferring TAS messages, in accordance with an embodiment that is described herein. In the example embodiment of FIG. 2, UE processor 40 prepares for transferring a TAS message, which is indicative of a system time T, from BBIC 24 to RFIC 32 over DigRF interface 28. In the present example, UE 20 comprises a multi-RAT UE, and TAS messages are therefore delayed by a delay that depends on the currently-used RAT.

The method begins at a counter programming operation 60, in which UE processor 40 programs counter 48 with a WAIT delay that depends on the RAT that is currently in use by the UE. At a message loading operation 64, UE processor 40 loads TAS message register 52 with a TAS message that is to be transferred to RFIC 32. At a trigger setting operation 68, UE processor 40 sets trigger unit 44 to issue a trigger at system time T.

At a triggering operation 72, when system time T arrives, trigger unit 44 issues the trigger, and counter 48 delays the trigger by the RAT-dependent WAIT delay. Upon expiry of the WAIT delay, at a message transfer operation 76, counter 48 triggers TAS message register 52 and the TAS message register transfers the TAS message to DigRF interface 28. At a DigRF transfer operation 80, DigRF interface 28 transfers the TAS message to RFIC 32.

Figure 3:
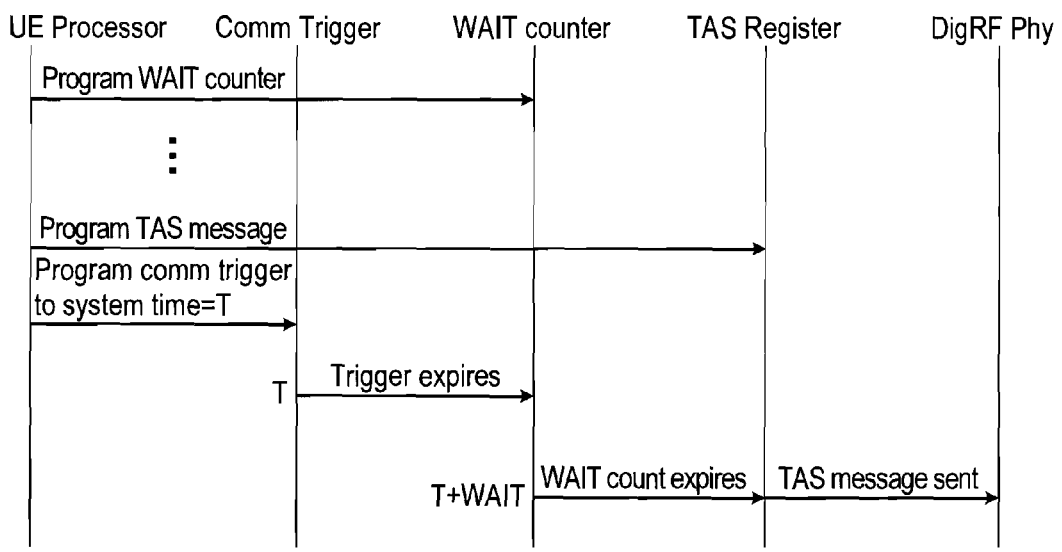
FIG. 3 is a diagram that schematically illustrates a process for generating and transferring TAS messages, in accordance with an embodiment that is described herein.

FIG. 3 is a diagram that schematically illustrates a process for generating and transferring TAS messages, in accordance with an embodiment that is described herein. The figure illustrates the flow of triggers and messages during generation and transfer of a TAS message. Initially, UE processor programs counter 48 with the desired WAIT delay. This action may be performed, for example, during power-up initialization of the UE, or at any other suitable stage.

When preparing to transfer a TAS message, UE processor 40 loads the TAS message to register 52, and programs trigger unit 44 to the system time T at which the message should be transferred. When system time T arrives, trigger unit 44 issues a trigger to counter 48. When counter 48 completes the counting of the WAIT delay (at system time T+WAIT), counter 48 triggers register 52 to send the TAS message to DigRF interface 28.

The order at which the operations are executed in FIGS. 2 and 3 is an example order, which is shown solely for the sake of clarity. In alternative embodiments, any other suitable execution order can be used. For example, UE processor 40 may load the TAS message into register 52 before programming counter 48.

Although the embodiments described herein refer mainly to DigRF interfaces and TAS messages in mobile communication terminals, the disclosed techniques can be used with any other suitable communication application having accurate timing functions, any other suitable digital interface, and any other suitable type of strobe messages.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. Apparatus, comprising:
   Radio Frequency (RF) circuitry, which is configured to receive strobe messages that are based on a system clock over a digital interface, and to communicate at a first time granularity, synchronously with the system clock based on the received strobe messages in accordance with a Radio Access Technology (RAT) that is selected from among multiple different RATs; and
   baseband circuitry, which is configured to generate the strobe messages at a second time granularity that is coarser than the first time granularity, to delay the strobe messages by a delay, which depends on the selected RAT and is set to compensate for a mismatch between the first and second time granularities, and to send the delayed strobe messages to the RF circuitry over the digital interface.

2. The apparatus according to claim 1, wherein the digital interface operates in accordance with a DigRF specification, wherein the RF circuitry is configured to receive DigRF Time Accurate Strobe (TAS) messages, and wherein the baseband circuitry is configured to generate the TAS messages.

3. The apparatus according to claim 1, wherein the baseband circuitry comprises a First In First Out (FIFO) memory having a configurable latency, and is configured to delay the strobe messages by setting the latency of the FIFO memory based on the delay and streaming the strobe messages through the FIFO memory.

4. The apparatus according to claim 1, wherein the digital interface operates at a third time granularity that is different from the first and second time granularities, and wherein the baseband circuitry is configured to set the delay to compensate for the mismatch among the first, second and third time granularities.

5. The apparatus according to claim 1, wherein the second time granularity of the baseband circuitry depends on the selected RAT.

6. The apparatus according to claim 1, wherein the digital interface has a variable initialization latency that does not exceed a specified maximum latency, and wherein the baseband circuitry is configured to set the delay to be higher than the specified maximum latency.

7. The apparatus according to claim 1, wherein the RF circuitry is of a given version that is selected from two or more possible versions, and wherein the baseband circuitry is configured to set the delay depending on the given version of the RF circuitry.

8. A mobile communication terminal comprising the apparatus of claim 1.

9. A chipset for processing signals in a mobile communication terminal, comprising the apparatus of claim 1.

10. Apparatus, comprising:
    Radio Frequency (RF) circuitry, which is configured to receive strobe messages that are based on a system clock over a digital interface, and to communicate synchronously with the system clock based on the received strobe messages in accordance with a Radio Access Technology (RAT) that is selected from among multiple different RATs; and
    baseband circuitry, which comprises a programmable counter and is configured to generate the strobe messages, to delay the strobe messages with a delay that depends on the selected RAT, by initializing the programmable counter based on the delay and enabling the strobe messages upon expiry of the counter, and to send the delayed strobe messages to the RF circuitry over the digital interface.

11. A method, comprising:
    using baseband circuitry, generating strobe messages based on a system clock;
    delaying the strobe messages in the baseband circuitry by a delay that depends on a Radio Access Technology (RAT) that is selected from among multiple different RATs;
    sending the delayed strobe messages over a digital interface from the baseband circuitry to Radio Frequency (RF) circuitry; and
    at the RF circuitry, which is configured to communicate at a first time granularity, receiving the strobe messages over the digital interface, and communicating synchronously to the system clock based on the received strobe messages in accordance with the selected RAT,
    wherein generating the strobe messages comprises producing the strobe messages in the baseband circuitry at a second time granularity that is coarser than the first time granularity, and wherein delaying the strobe messages comprises setting the delay to compensate for a mismatch between the first and second time granularities.

12. The method according to claim 11, wherein generating and delaying the strobe messages comprises generating and delaying DigRF Time Accurate Strobe (TAS) messages, and wherein sending the delayed strobe messages comprises transferring the delayed TAS messages over the digital interface in accordance with a DigRF specification.

13. The method according to claim 11, wherein delaying the strobe messages comprises initializing a programmable counter based on the delay and enabling the strobe messages upon expiry of the counter.

14. The method according to claim 11, wherein generating the strobe messages comprises streaming the strobe messages through a First In First Out (FIFO) memory having a configurable latency, and wherein delaying the strobe messages comprises setting the latency of the FIFO memory based on the delay.

15. The method according to claim 11, wherein the digital interface operates at a third time granularity that is different from the first and second time granularities, and wherein delaying the strobe messages comprises setting the delay to compensate for the mismatch among the first, second and third time granularities.

16. The method according to claim 11, wherein the second time granularity of the baseband circuitry depends on the selected RAT.

17. The method according to claim 11, wherein the digital interface has a variable initialization latency that does not exceed a specified maximum latency, and wherein delaying the strobe messages comprises setting the delay to be higher than the specified maximum latency.

18. The method according to claim 11, wherein the RF circuitry is of a given version that is selected from two or more possible versions, and wherein delaying the strobe messages comprises setting the delay depending on the given version of the RF circuitry.

\* \* \* \* \*